Aug. 19, 1947.  A. H. SKWIERAWSKI  2,426,124

DRILL PRESS ATTACHMENT

Filed May 31, 1945

INVENTOR
ARTHUR H. SKWIERAWSKI

BY

ATTORNEYS

Patented Aug. 19, 1947

2,426,124

UNITED STATES PATENT OFFICE 2,426,124

DRILL PRESS ATTACHMENT

Arthur H. Skwierawski, West Allis, Wis., assignor of one-half to James M. Herro, Milwaukee, Wis.

Application May 31, 1945, Serial No. 596,885

1 Claim. (Cl. 77—55)

My invention refers to drill press attachments or jigs and it has for its primary object to provide a simple and effective attachment for boring or counterboring machine elements or parts.

Another object of my invention is to provide a stirrup bracket attachable to the quill of a drill press, having a yielding head carrying a centrally apertured bushing for the reception of a drill and alignment therewith of a machine part of any shape to be bored or counter-bored at a predetermined depth.

A further specific object of my invention is to provide a bracket detachably secured to the quill of a drill press and a head having guide rods extending through the bracket carrying coil springs, whereby the head is yieldable, and adjustable stops carried by the bracket for limiting movement of said head, it being understood that the head carries a removable bushing, having a drill guide apertured therein, and socketed walls for centering a machine piece or unit to be operated upon.

With the above and other minor objects in view, my invention consists in certain peculiarities of construction and combination of parts as will be hereinafter set forth with reference to the accompanying drawings and subsequently claimed.

Figure 1:
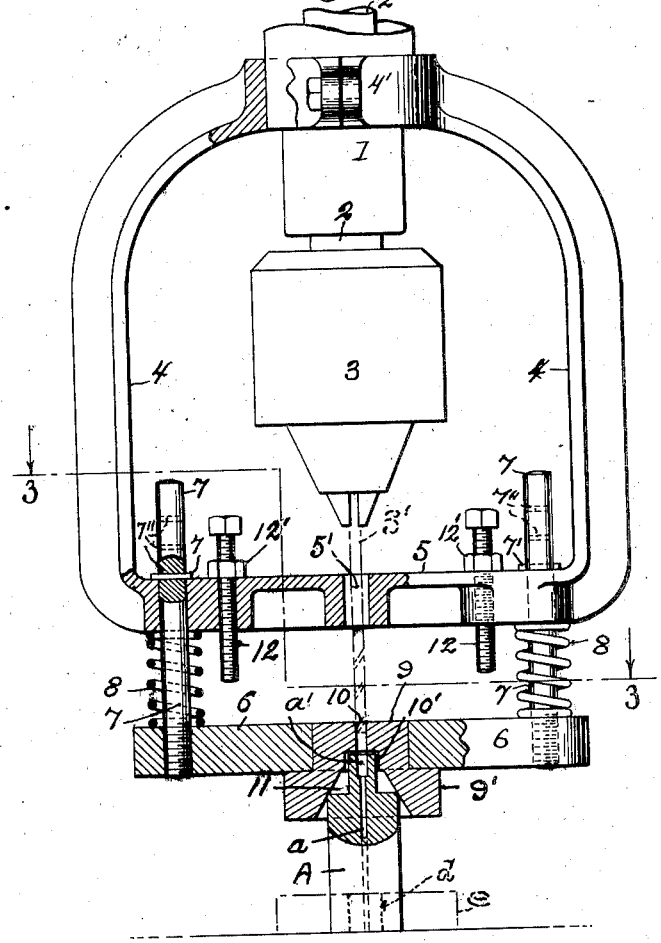
Figure 1 represents a side elevation of a drill press attachment embodying the features of my invention, the same being attached to the quill of a standard drill press, with parts broken away and in section to more clearly illustrate the structural features.

Referring by characters to the drawings, 1 indicates the quill of a standard drill press, the same encasing a spindle 2 carrying a drill chuck 3. The drill chuck, as indicated in dotted lines, has mounted therein a standard drill 3'. Arms 4 of a yoke are secured to the quill by a split hub 4' and said arms are connected by a horizontally positioned bridge 5, having a central drill aperture 5' through which the drill is guided and extends.

Positioned below the bridge 5 and parallel therewith is a head 6, which head carries a pair of guide rods 7—7 reciprocative in bearings formed in the bracket bridge piece. The guide rods 7 have mounted thereon a pair of coil springs 8—8, which coil springs are interposed between the bottom face of the bridge and top face of the head 6, whereby said head is carried by and held in yielding connection with the bracket.

When the head is in its normal position of rest, it is held in said position by keys 7'—7', which keys may be adjusted by engagement with a series of transverse apertures 7'' formed in the guide rods. The head is provided with a central opening into which is tightly fitted the shank 9 of a bushing 9'. The shank is provided with a central guide aperture 10 for the drill, and for certain purposes this aperture merges into a circular recess 10'. The lower face of the bushing is formed with an inwardly tapered socket 11 adapted to receive and center a certain type of machine fitting or part A, the said part being one of a series of small machine units of any shape and size which are to be bored or counterbored.

The base of the fitting A rests upon the bed of the drill and, for example, a series of such fittings are turned over to the drill press man and the same may be provided with a minute bore $a$ extending therethrough. The upper end of the fitting is shouldered and carries a nipple $b$, and the bore $a$ of this nipple is to be finished with a shouldered counter-bore, as indicated at $c$. It is understood that the fitting A to be rebored, is centered by the conical chuck socket and the end of the nipple will project into the circular recess 10' for clearance purposes.

Figure 2:
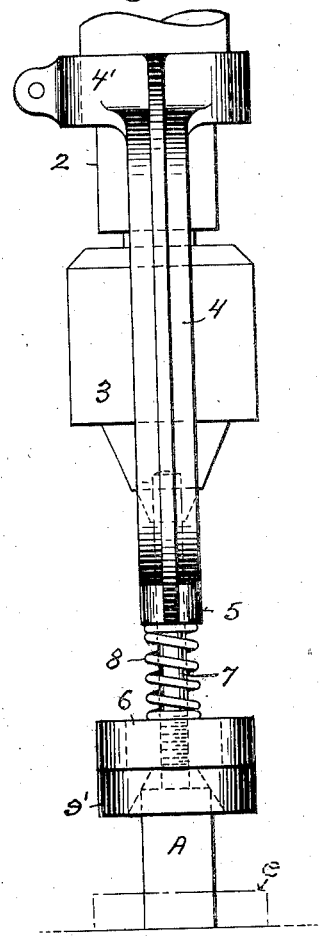
Figure 2 is an edge view of the same.

Should the part A embody a shouldered threaded nipple, the same may be protected by inserting the same into an opening $d$ with which a removable block $e$ may be provided and utilized as a bed piece for this particular type of fitting. The block is indicated in dotted lines in Figures 1 and 2. It is apparent when this particular type of fitting is to be counter-bored, as the quill and chuck carrying the bracket are moved downwardly, the fitting or part A will be engaged by the conical socket of the bushing and thus be centered. This action is followed by the downward movement of the rotating drill, and as said drill continues this movement, the head 6 will remain fixed while the bridge 5 of the bracket 4 will continue its downward movement, in conjunction with the end of the drill. Hence, the drill, which is of proper dimensions, will produce the counter-bore $a'$, as indicated in Figure 1, and the depth of this bore is micrometrically gauged, due to the fact that threaded stop pins 12 engage the upper face of the head and limit further downward movement of the drill. It is understood that in this action the coil springs are under full compression.

In order to micrometrically adjust the depth of a bore in any fitting, whether the bore is of a single diameter or shouldered by counter-bore, the stop pins 12 are adjusted to control said depth. It should be further noted that the stop pins may be of any type and that they are in threaded union with the bridge piece 5 of the double arm yoke bracket, and that suitable check nuts 12' may be utilized to prevent displacement of a fine adjustment of said stop pins.

From the foregoing description, it is emphasized that the yoke is attached to the quill above the drill chuck 3 and encases the same as a protector thereof. Furthermore, the bridge piece 5 of the equipment is arranged parallel with the head 6 and both of the same are provided with apertures which serve as a pair of guides for the delicate drills which extend therethrough, whereby said drills are protected against vibration at two points.

It will also be noted that the spring controlled guide rods, carried by the head, are balanced, with reference to the drill, and also the pair of stop pins are similarly positioned and balanced, whereby, when pressure is applied to the head, it is perfectly balanced, in a drilling operation, to insure perfect alignment of the drill in what might be termed micrometrically accurate work.

Figure 3:
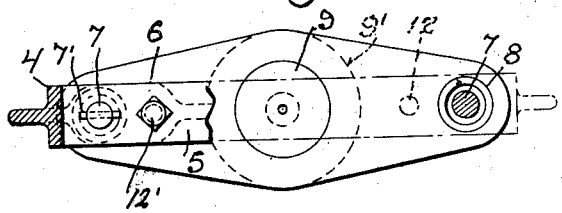
Figure 3 is a cross sectional plan view of the attachment, the section being indicated by line 3—3 of Figure 1.
Figure 4:
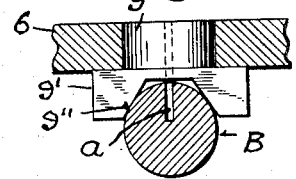
Figure 4 is a sectional fragmental view showing another form of bushing for the reception of circular machine parts or tubes to be drilled.

As an example of the innumerable types of fittings or parts, which are presented for special drilling, Figure 3 of the drawings illustrates a cylindrical section B for boring. In this case the section is to be bored a predetermined depth. To provide proper chucking of the fitting B, the bushing 9', as shown in Figure 4, is formed with a slot extending therethrough having conical walls 9", which extend through the bushing. It is understood that for various forms of machine parts to be worked upon, when necessary, a special bushing for holding said fittings is provided.

In practice, from applicant's knowledge, when a variety of small machine parts or elements, are presented for a micromic boring operation, the drill press operator must finish said parts practically by hand and with crude means for controlling the depth of bores, and it also follows that skill is required to avoid damage to such parts. Hence, it has been found that such parts mentioned, when tooled by hand, the limited output is approximately 300 per hour. With my improved jig attachment, the output, for finishing the same article, will average approximately 3000 per hour. Thus it will be noted that a substantial saving in cost of production is the result of the application of my drill press attachment, to standard equipment.

Changes in details may be made without departing from the spirit or the scope of my invention, but what I claim as new is:

In a drill press having a quill and a chuck at its end; the combination of a boring attachment comprising a balanced yoke secured to the quill and encasing the chuck, a horizontally positioned bridge piece connecting the yoke arms having a central drill guide aperture therein, a head below the bridge in parallel relations therewith having a drill aperture in alignment with the bridge aperture, a bushing carried by the head for the reception of machine parts to be fitted therein, a pair of spring controlled guide rods carried by the head in slidable union with the bridge piece, and a pair of adjustable stop pins in threaded union with the aforesaid bridge piece upon opposite sides of its drill aperture, whereby the yoke unit, as an entirety, is balanced with relation to the drill press quill.

ARTHUR H. SKWIERAWSKI.

REFERENCES CITED

The following references are of record in the file of this patent:

UNITED STATES PATENTS

| Number | Name | Date |
|---|---|---|
| 1,590,643 | Neuwelt | June 29, 1926 |
| 2,360,942 | Ellerstein | Oct. 24, 1944 |
| 1,361,664 | Ashman | Dec. 7, 1920 |